(12) United States Patent
Trowell

(10) Patent No.: US 9,266,435 B2
(45) Date of Patent: Feb. 23, 2016

(54) CONTROLLER AND CONTROL METHOD FOR A MOTORISED VEHICLE

(75) Inventor: Matthew John Trowell, Christchurch (GB)

(73) Assignee: Penny & Giles Controls Limited (GB)

( * ) Notice: Subject to any disclaimer, the term of this patent is extended or adjusted under 35 U.S.C. 154(b) by 1474 days.

(21) Appl. No.: 12/780,782

(22) Filed: May 14, 2010

(65) Prior Publication Data

US 2011/0238265 A1    Sep. 29, 2011

(30) Foreign Application Priority Data

Mar. 24, 2010 (GB) ................................ 1004984.9

(51) Int. Cl.
*B60L 3/10* (2006.01)

(52) U.S. Cl.
CPC .............. *B60L 3/102* (2013.01); *Y02T 10/7258* (2013.01)

(58) Field of Classification Search
CPC ......... B60L 3/102; B60L 3/104; B60L 3/106; B60L 2200/24; B60L 2200/34; B60L 2200/16
USPC .......................................................... 701/41
See application file for complete search history.

(56) References Cited

U.S. PATENT DOCUMENTS

| | | | |
|---|---|---|---|
| 5,033,000 A | 7/1991 | Littlejohn et al. | |
| 5,307,888 A | 5/1994 | Urvoy | |
| 2006/0066268 A1 | 3/2006 | Noro et al. | |
| 2010/0007299 A1 | 1/2010 | Davis et al. | |

FOREIGN PATENT DOCUMENTS

| | | |
|---|---|---|
| JP | 09130920 A | 5/1997 |
| JP | 2003070847 A | 3/2003 |
| JP | 2006043072 A | 2/2006 |

OTHER PUBLICATIONS

International Search Report for Application No. GB1004984.9, dated Jul. 26, 2010.
"enAble40 Powerchair Control System", product manual produced by Curtis Instruments, Inc. of New York, USA.

*Primary Examiner* — Mussa A Shaawat
*Assistant Examiner* — Kyung Kim
(74) *Attorney, Agent, or Firm* — Haynes Beffel & Wolfeld LLP

(57) ABSTRACT

A controller for a motorized vehicle having at least a left wheel and a right wheel is provided, where the left wheel and the right wheel are driven independently by a motor arrangement. The controller is arranged to receive control signals from a user input device of the motorized vehicle, the control signals determining a requested left wheel velocity and a requested right wheel velocity. A requested speed of the motorized vehicle is given by a mean of the requested left wheel velocity and the requested right wheel velocity and a requested spin of the motorized vehicle is given by a mean difference of the requested left wheel velocity and the requested right wheel velocity. A scaling unit determines a scaling factor in dependence on the requested speed and the requested spin and scales both the requested speed and the requested spin by the scaling factor to generate a target speed and a target spin. The controller is configured to convert the target speed and the target spin into a target left wheel velocity and a target right wheel velocity and the motor arrangement is responsive to the controller to drive the left wheel at the target left wheel velocity and to drive the right wheel at the target right wheel velocity.

17 Claims, 10 Drawing Sheets

CONTROLLER AND CONTROL METHOD FOR A MOTORISED VEHICLE

RELATED APPLICATION

This application claims the benefit of United Kingdom Application No. 1004984.9 filed 24 Mar. 2010. The priority application is hereby incorporated by reference.

This application is related to U.S. patent application titled "A Controller And Control Method For A Motorised Vehicle", and given Attorney Docket No. DYNG 2007-1/P0398004US, filed contemporaneously. The related application is hereby incorporated by reference.

BACKGROUND OF THE INVENTION

1. Field of the Invention

The technology disclosed relates to a controller and a control method for a motorised vehicle, and in particular to a controller for a motorised vehicle having at least a left wheel and a right wheel, the left wheel and the right wheel being driven independently by a motor arrangement. In accordance with such motorised vehicles, turning of the vehicle is typically effected by driving the left wheel and the right wheel at different speeds. A typical example of such a motorised vehicle is an electric wheelchair.

2. Description of the Prior Art

Conventional electric wheelchairs have at least a left wheel and a right wheel which are driven independently by a motor arrangement. Whilst the motor arrangement used to drive the wheels may comprise a single motor with independent couplings between the motor and the wheels to effect independent drive of those wheels, it is more common that each driven wheel is driven by an independent motor. Often the electric wheelchair will include two or more castors which rotate to follow the direction of travel, and optionally a number of further fixed wheels may be provided. The speed and direction of each driven wheel defines a linear forward/reverse speed and turning (spin) rate of the wheelchair.

A typical input control interface for an electric wheelchair provides a joystick having two control axes, one to control the forward/reverse speed and one to control the turn rate (or spin speed). However, it will be appreciated that a joystick is not a requirement, and many other types of input control interface have been developed to allow control by users with a variety of different disabilities, for example, head control based mechanisms, sip puff based mechanisms and so on.

In providing the user of an electric wheelchair with control over its speed and spin, it is nonetheless common to impose certain limits on combinations of speed and spin which the user can request. This is done essentially for safety reasons, because for example a maximum spin speed (with the left and right wheel being driven in opposite directions) may be simply requested when the wheelchair is stationary (to thus pivot on the spot), but such a sharp turn would be dangerous if requested when the wheelchair is already travelling with substantial linear speed, in the worst case scenario causing the wheelchair to overturn. It is therefore known to impose "gate shaping" on the control interface, which typically allows a greater degree of spin to be requested in combination with low linear speeds, whilst limiting more restrictively the spin that may be requested in combination with high linear speeds. Such gate shaping is typically implemented by means of an algorithm which transforms signals from the user's control interface into signals which control the motors of the wheelchair.

Even without entering a regime where the wheelchair is liable to tip over, management of the speed and spin of the wheelchair is still necessary because of the effect that certain combinations of speed and spin can have on the traction of each wheel during a turn. A loss of fraction of one wheel can have undesirable consequences for the handling of the wheelchair when making a turn. One reason why traction may be lost is the centripetal force acting on the wheelchair during a turn, which will tend to lift the inside wheel thus reducing its traction. This problem is worse with front wheel drive wheelchairs since the inside wheel is the high torque wheel and is thus more likely to lose traction. If a significant degree of transaction is lost on the inside wheel, then the wheelchair may be liable to spin out of control into the turn. Even without such drastic lost of control, even a smaller loss of traction may cause handling difficulties for the user of the wheelchair, since the turn radius which the wheelchair follows will not correspond to that requested by the operation of the user controls.

Conventional gate shaping approaches to this problem can certainly prevent the wheelchair from overturning, but nevertheless suffer from problems in the handling characteristics of the wheelchair due to the imposed limits on the relative speed and spin affecting the smooth steering feel of the wheelchair, and have led to the overly severe inhibiting of the spin speed in certain joystick demand regions.

Some background technological information to the technology disclosed can be found in the "enAble40 Powerchair Control System" manual produced by Curtis Instruments, Inc. of New York, USA; in U.S. Pat. Nos. 5,033,000 and 5,307,888; and in US Patent Application Publication 2010/0007299 A1.

It would be desirable to provide an improved technique for controlling motorised vehicles which would alleviate the above-discussed problems.

SUMMARY OF THE INVENTION

Viewed from a first aspect, the technology disclosed provides a controller for a motorised vehicle having at least a left wheel and a right wheel, said left wheel and said right wheel being driven independently by a motor arrangement, the controller being arranged to receive control signals from a user input device of the motorised vehicle, the control signals determining a requested left wheel velocity and a requested right wheel velocity, wherein a requested speed of said motorised vehicle is given by a mean of said requested left wheel velocity and said requested right wheel velocity, and wherein a requested spin of said motorised vehicle is given by a mean difference of said requested left wheel velocity and said requested right wheel velocity, the controller comprising: a scaling unit configured to determine a scaling factor in dependence on said requested speed and said requested spin, and to scale both said requested speed and said requested spin by said scaling factor to generate a target speed and a target spin, wherein said controller is configured to convert said target speed and said target spin into a target left wheel velocity and a target right wheel velocity, the motor arrangement being responsive to said controller to drive said left wheel at said target left wheel velocity and to drive said right wheel at said target right wheel velocity.

In accordance with the technology disclosed, a scaling unit is arranged to determine a scaling factor in dependence on both the requested speed and the requested spin that the user has requested. This scaling factor is then used by the scaling unit to scale both the requested speed and the requested spin to generate a target speed and a target spin, which are then converted into a corresponding left wheel velocity and right wheel velocity. By applying the same scaling factor to both the requested speed and the requested spin, it has been found that a smoother handling characteristic of the motorised vehicle is provided. In particular, it has advantageously been found that a turn radius of the motorised vehicle is not changed by the application of this scaling factor, which provides that the steering 'feel' of the motorised vehicle is not affected. Also the techniques of the technology disclosed provide that the turn radius changes smoothly with respect to varying control signals from the user input device (for example the angle of a joystick).

There are a number of ways in which the scaling unit could determine the scaling factor in dependence on the requested speed and the requested spin, however, in one embodiment the scaling unit is configured to determine said scaling factor in dependence on a centripetal acceleration limit for said motorised vehicle. It is the centripetal acceleration acting on the motorised vehicle which will tend to lift the inside wheel on a turn, thus reducing its traction. The inventor of the technology disclosed realised that by determining the scaling factor in dependence on a centripetal acceleration limit, the handling of the motorised vehicle could be managed in such a way as to precisely avoid those situations in which the motorised vehicle is likely to lose traction. In some embodiments the scaling unit is configured to implement said centripetal acceleration limit as a centripetal force limit. It will be recognised that a centripetal acceleration may also be expressed in terms of a centripetal force (by including the relevant mass in the calculation, since F=ma) and the scaling unit could be configured to operate in terms of either a centripetal acceleration limit or a centripetal force limit.

Although the centripetal acceleration limit could be incorporated into the scaling factor in a number of ways, in one embodiment said scaling factor is proportional to a square root of said centripetal acceleration limit. The centripetal acceleration of a motorised vehicle can be shown to be proportional to the product of its speed and its spin, and hence for a scaling factor which is applied to both the speed and the spin, it is advantageous that the scaling factor is proportional to the square root of the centripetal acceleration limit. In this way the speed and the spin may be scaled by the same factor so as to maintain the demanded turn radius without exceeding this predetermined centripetal acceleration limit.

Depending on various factors such as the type of motorised vehicle, the environment in which it is to be used, the relative ability of the user of the motorised vehicle and so on, the centripetal acceleration limit could be variously defined. However, in one embodiment said centripetal acceleration limit corresponds to an upper limit of centripetal acceleration of said motorised vehicle on a turn, wherein the one of said left wheel and said right wheel which is inside the turn loses fraction when said motorised vehicle has a centripetal acceleration above said centripetal acceleration limit. Defining the centripetal acceleration limit in this way enables the scaling unit to determine the scaling factor, such that handling of the motorised vehicle is managed in such a way as to keep the motorised vehicle within a regime where it does not lose traction on turns.

Whilst the centripetal acceleration limit could be continually recalculated, or adjusted according to driving conditions, according to one embodiment the controller further comprises a storage unit for storing a predetermined value of said centripetal acceleration limit. Hence, the scaling unit can refer to this stored predetermined value of the centripetal acceleration limit when determining the scaling factor.

Whilst there are various ways in which the scaling factor could be determined in dependence on the requested speed and requested spin, according to one embodiment the scaling factor is inversely proportional to a square root of a product of said requested speed and said requested spin. Determining the scaling factor in this manner allows a scalar quantity to be used which is dimensionally correct for the purposes of scaling both speed and spin.

In one embodiment, the scaling factor ($K_{scalar}$) is defined as $$K_{Scalar} = \sqrt{\frac{CentripetalAccelerationLimit}{RequestedSpeed \cdot RequestedSpin}}.$$

In one embodiment, the scaling factor has an upper limit of 1. This ensures that the scaling factor only operates as a reduction in both speed and spin.

It will be appreciated that the control signals from the user input device to the motorised vehicle could take a number of forms, but in one embodiment these control signals comprise a forward signal and a spin signal.

Whilst the techniques of the technology disclosed could be applied to a number of different motorised vehicle configurations, in one embodiment said motorised vehicle is a front wheel drive vehicle. Problems of loss of traction on turns are more prevalent in front wheel drive vehicles, since the inside wheel is then the high torque wheel and is thus more likely to lose traction.

In one embodiment the motorised vehicle takes the form of wheelchair.

Viewed from a second aspect the technology disclosed provides a motorised vehicle comprising: a motor arrangement; at least a left wheel and a right wheel, said left wheel and said right wheel being driven independently by said motor arrangement; a user input device configured to issue control signals for motorised vehicle, the control signals corresponding to a requested left wheel velocity and a requested right wheel velocity; and a controller in accordance with the first aspect of the technology disclosed for controlling the driving of said left wheel and said right wheel in dependence on said control signals.

The motorised vehicle may take a variety of forms, but in one embodiment the motorised vehicle is a wheelchair. The techniques of embodiments of the technology disclosed are particularly beneficial when using a electric wheelchairs, which often encounter the loss of traction when turning which the techniques of embodiments of the technology disclosed seek to alleviate.

Viewed from a third aspect the technology disclosed provides a method of controlling a motorised vehicle having at least a left wheel and a right wheel, said left wheel and said right wheel being driven independently by a motor arrangement, comprising the steps of: receiving control signals from a user input device of the motorised vehicle, the control signals determining a requested left wheel velocity and a requested right wheel velocity, wherein a requested speed of said motorised vehicle is given by a mean of said requested left wheel velocity and said requested right wheel velocity, and wherein a requested spin of said motorised vehicle is given by a mean difference of said requested left wheel velocity and said requested right wheel velocity; determining a scaling factor in dependence on said requested speed and said requested spin; scaling both said requested speed and said requested spin by said scaling factor to generate a target speed and a target spin; and converting said target speed and said target spin into a target left wheel velocity and a target right wheel velocity, the motor arrangement being responsive to said controller to drive said left wheel at said target left wheel velocity and to drive said right wheel at said target right wheel velocity.

Viewed from a fourth aspect the technology disclosed provides a computer program product comprising a computer program which when executed on a computing device causes a motorised vehicle having at least a left wheel and a right wheel, said left wheel and said right wheel being driven independently by motor arrangement, to be controlled in accordance with the third aspect of the technology disclosed.

Viewed from a fifth aspect the technology disclosed provides a controller for a motorised vehicle having at least a left wheel and a right wheel, said left wheel and said right wheel being driven independently by a motor arrangement, the controller being arranged to receive control signals from a user input device of the motorised vehicle, the control signals determining a requested left wheel velocity and a requested right wheel velocity, wherein a requested speed of said motorised vehicle is given by a mean of said requested left wheel velocity and said requested right wheel velocity, and wherein a requested spin of said motorised vehicle is given by a mean difference of said requested left wheel velocity and said requested right wheel velocity, the controller comprising: a scaling means for determining a scaling factor in dependence on said requested speed and said requested spin, and for scaling both said requested speed and said requested spin by said scaling factor to generate a target speed and a target spin, wherein said controller is configured to convert said target speed and said target spin into a target left wheel velocity and a target right wheel velocity, the motor arrangement being responsive to said controller to drive said left wheel at said target left wheel velocity and to drive said right wheel at said target right wheel velocity.

The above, and other objects, features and advantages of this invention will be apparent from the following detailed description of illustrative embodiments which is to be read in connection with the accompanying drawings.

DESCRIPTION OF EMBODIMENTS

Figure 1A:
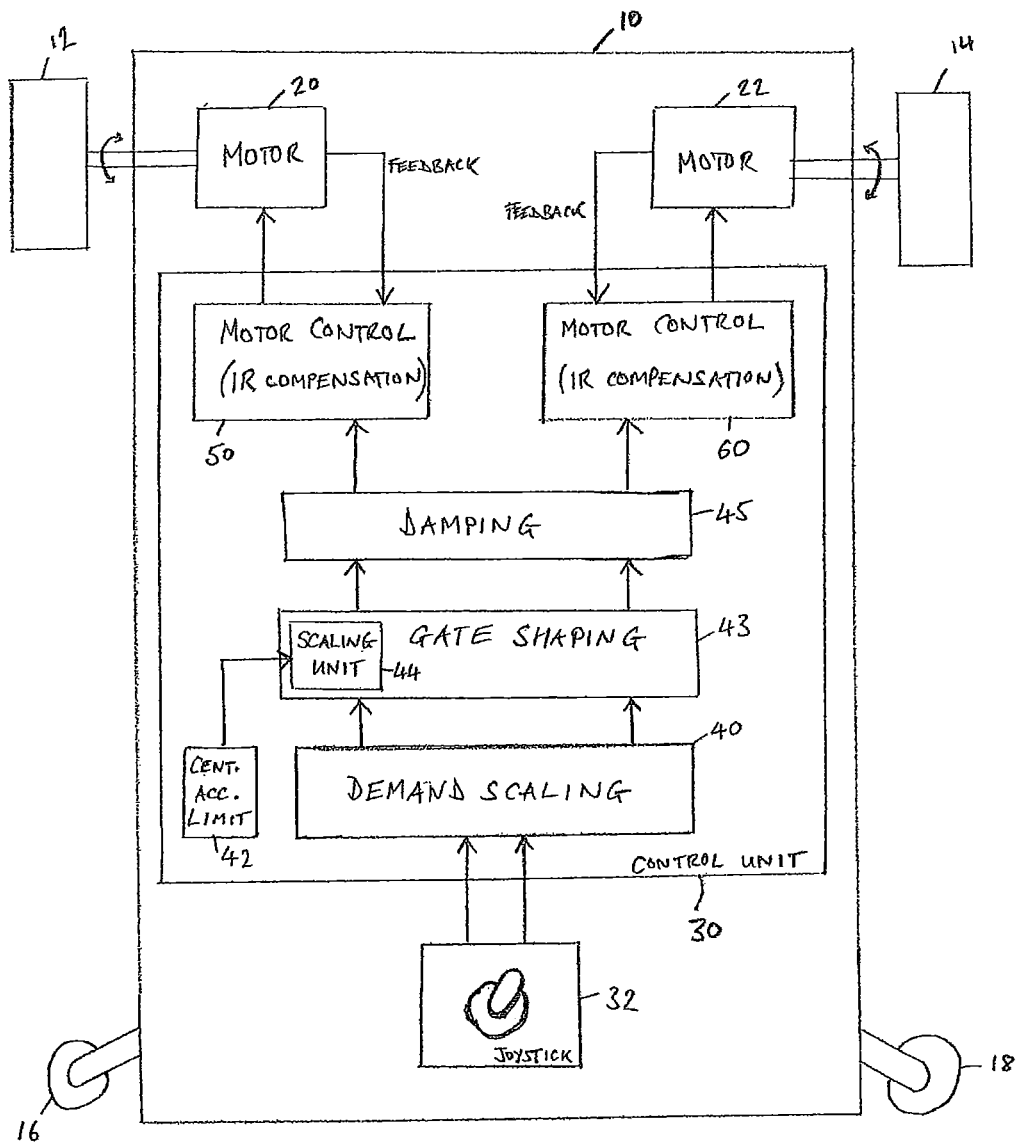
FIG. 1A is a block diagram of a motorised vehicle in accordance with one embodiment of the technology disclosed.

FIG. 1A is a block diagram of a motorised vehicle in accordance with one embodiment of the technology disclosed. For the purposes of the following discussion, the example where the motorised vehicle is an electric wheelchair will be used. In the example of FIG. 1A, the electric wheelchair has a chassis 10 to which two motor driven wheels are connected, namely a left wheel 12 and a right wheel 14. Further, a pair of castors 16, 18 are also provided on the chassis which rotate to follow the direction of travel of the wheelchair. In the illustrated example, the wheelchair is a front wheel drive wheelchair, so that the castors 16, 18 typically follow the direction in which the driven wheels 12, 14 lead (except of course when the wheelchair is in reverse). Each of the two motor driven wheels 12, 14 are driven independently by a motor arrangement. In the embodiments illustrated, the left wheel 12 is driven by the motor 20 and the right wheel 14 is driven by the motor 22. To make the vehicle move forwards or backwards both wheels are driven in the same direction. To make the vehicle turn to the left or right whilst driving, the wheels are driven the same direction but with different speeds. It is also possible to effect an even tighter turning of the wheelchair, by driving the two wheels 12, 14 in opposite directions, which causes the wheelchair to spin on the spot.

Whilst in FIG. 1A the driven wheels are provided at the front of the wheelchair and the castors 16, 18 are provided towards the back, it will be appreciated that in an alternative embodiment the driven wheels may be at the rear and the castors may be at the front. Indeed, in further embodiments the driven wheels may be provided in the middle of the wheelchair, with a selection of castors and other fixed non-driven wheels also being provided to stabilise the wheelchair chassis 10. As shown in FIG. 1A, a control unit 30 is provided on the wheelchair chassis 10 which is coupled to an input control module 32 via which a user of the wheelchair can enter drive commands. Whilst the control unit 30 and input control module 32 are shown here as separate elements, it will be appreciated that in some embodiments these components may be incorporated into a single housing. As also shown in FIG. 1A, the input control module 32 is, in this example, a joystick, which provides an intuitive user-friendly interface. It should noted that a front wheel drive wheelchair such as that illustrated in FIG. 1A will typically have its joystick mounted near the front of the wheelchair for the convenience of the user. Joystick 32 is positioned in FIG. 1A for schematic clarity alone.

All of the electrical components on the wheelchair receive power from an on-board battery (not illustrated), which is typically a heavy-duty rechargeable battery capable of providing the relatively large currents used to drive the motors 20, 22 during operation of the wheelchair.

The control unit 30 receives control signals from the user input device 32, on the basis of which it generates motor control signals which determine the operation of motors 20, 22. In the illustrated embodiment the joystick 32 is a proportional joystick which provides the control unit 30 with digital control signals indicating a forward component and a spin component. In addition the control unit 30 is configured such that the spin requested by the user is limited in dependence on the requested speed.

In operation, the control unit 30 receives the control signals and first performs a demand scaling on them in demand scaling unit 40. Typically this demand scaling will scale the requested speed and spin such that the requested spin may not exceed a predetermined fraction (e.g. 30%) of the requested speed. In effect this transforms a circular phase space ("gate shape") of the joystick input signals into an elliptical shape (the speed being the major axis and the spin being the minor axis). The demand scaled signals are then passed to the gate shaping unit 43, which further modifies the signals in dependence on the drive algorithm which the control unit 30 is configured to apply. In particular (as will be discussed in more detail below), the gate shaping unit applies a scaling factor to both the requested speed and the requested spin (by means of scaling unit 44) before passing the thus-modified signals to damping unit 45 which damps the control signals (on a time basis, to provide a smoother response of the wheelchair to the control signals) and passes the scaled and damped control signals to left motor control unit 50 and right motor control unit 60 respectively.

Left motor control unit 50 and right motor control unit 60 generate the direct control signals for the left motor 20 and right motor 22 respectively. In the illustrated embodiment, these are in the form of a voltage applied to each motor, a higher voltage causing the motor to turn faster, the speed of the motor also being dependent on the current load that it is experiencing. Left motor control unit 50 and right motor control unit 60 each form part of a feedback loop, wherein left motor control unit 50 receives feedback signals from left motor 20 and right motor control unit 60 receives feedback signals from right motor 22. Typically the feedback signals from the motors 20, 22 comprise an instantaneous current and voltage measurement of each respective motor. Each motor control unit performs a technique known as IR compensation, wherein the speed of each motor is estimated according to the formula:

$$\text{Speed} = k_{emf}(V_m - (I_m \times R_m))$$

where $k_{emf}$ is the back e.m.f. constant, $V_m$ is the voltage applied to the motor, $I_m$ the current drawn by the motor and $R_m$ is the resistance of the motor windings.

The value of $R_m$ is programmed to a chosen value and the current drawn by the motor is monitored. As the current varies the voltage applied to motor is varied with the aim of keeping the speed constant whilst the user input is indicating a constant speed should be maintained.

The operation of scaling unit 44 is now described. Firstly it is useful to consider some mathematics underlying the motion of the wheelchair. The speed and spin of the wheelchair may be defined in terms of the velocities of the left and right wheel 12, 14 as follows:

$$\text{Speed} = \frac{(VL + VR)}{2} \qquad \text{Equation 1}$$

$$\text{Spin} = \frac{(VL - VR)}{2}$$

In terms of these quantities the turn radius of the wheelchair may be defined as:

$$\text{TurnRadius} = \frac{Laxle}{2} \times \frac{\text{Speed}}{\text{Spin}} \qquad \text{Equation 2}$$

Where Laxle is the distance between drive wheels 12 and 14. The centripetal acceleration may then be defined as follows:

$$\text{CentripetalAccel} = \frac{\text{Speed}^2}{\text{TurnRadius}} \qquad \text{Equation 3}$$

Combining equations 2 and 3 yields the following, showing that centripetal acceleration is proportional to the product of speed and spin:

$$\text{CentripetalAccel} = \frac{\text{Speed}^2}{\text{TurnRadius}} \qquad \text{Equation 4}$$

$$= \frac{2}{Laxle} \times \text{Speed} \cdot \text{Spin} \Rightarrow$$

$$\text{CentripetalAccel} \propto (\text{Speed} \cdot \text{Spin})$$

The scaling unit 40 is configured to determine a scaling factor $K_{scalar}$ by which both the requested speed and the requested spin are scaled. Introducing $K_{scalar}$ into the relationship derived above in equation 4 between centripetal acceleration, speed and spin yields the following:

$$\text{CentripetalAccelLimit} = K_{Scalar} \cdot \text{Speed} \times K_{Scalar} \cdot \text{Spin} \Rightarrow \qquad \text{Equation 5}$$

$$K_{Scalar} = \sqrt{\frac{\text{CentripetalAccelLimit}}{\text{Speed} \cdot \text{Spin}}}$$

Consequently it can be seen that the scaling factor $K_{scalar}$ can be determined in terms of a constant centripetal acceleration limit such that the speed and the spin of the wheelchair are modified such that centripetal acceleration limit is not exceeded. Since the centripetal acceleration limit is a constant this may be predetermined and in the example illustrated in FIG. 1A a value may be stored in the centripetal acceleration limit storage unit 42 for reference by scaling unit 40. Hence, scaling unit 44 continually calculates a new value of $K_{scalar}$ by which the speed and spin values requested by joystick 32 (and demand scaled by demand scaling unit 40) are scaled. In order to maintain only a upper centripetal acceleration limit $K_{scalar}$ is capped such that it always takes values less than or equal to 1.

Figure 1B:
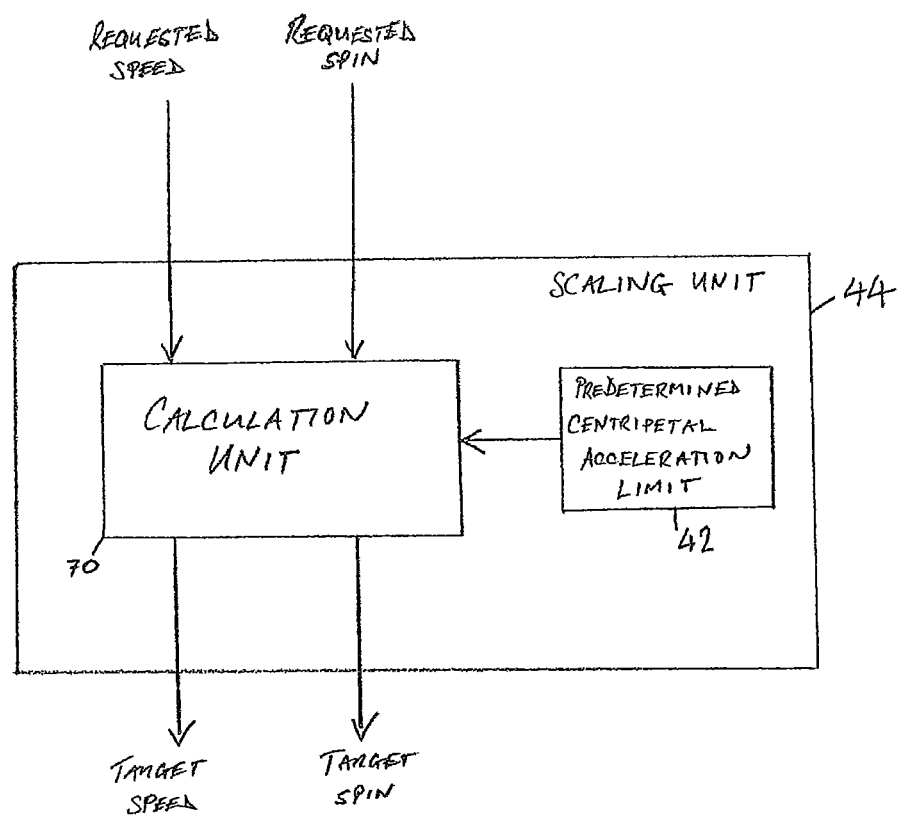
FIG. 1B is a block diagram illustrating in more detail the scaling unit of FIG. 1A.

FIG. 1B schematically illustrates in a little more detail the scaling unit 44 of FIG. 1A. The main component of the scaling unit 44 is a calculation unit 70, which receives the requested speed and the requested spin from the joystick 32 (via demand scaling unit 40) and determines the scaling factor $K_{scalar}$ in dependence thereon. Here the centripetal acceleration limit storage unit 42 is illustrated as being comprises within the scaling unit 44, but it will be appreciated that the calculation unit only needs access to the value stored therein and the location of this storage unit is of little significance (see the alternative location illustrated in FIG. 1A). The calculation unit 70 applies the same scaling factor $K_{scalar}$ to both the requested speed and the requested spin to generate the target speed and the target spin respectively (when $K_{scalar}$ is less than or equal to one). A typical embodiment of the calculation unit 70 is as part of an embedded processor in the control unit of the wheelchair. Further description of such a processor is given below with reference to FIG. 9.

Figure 2:
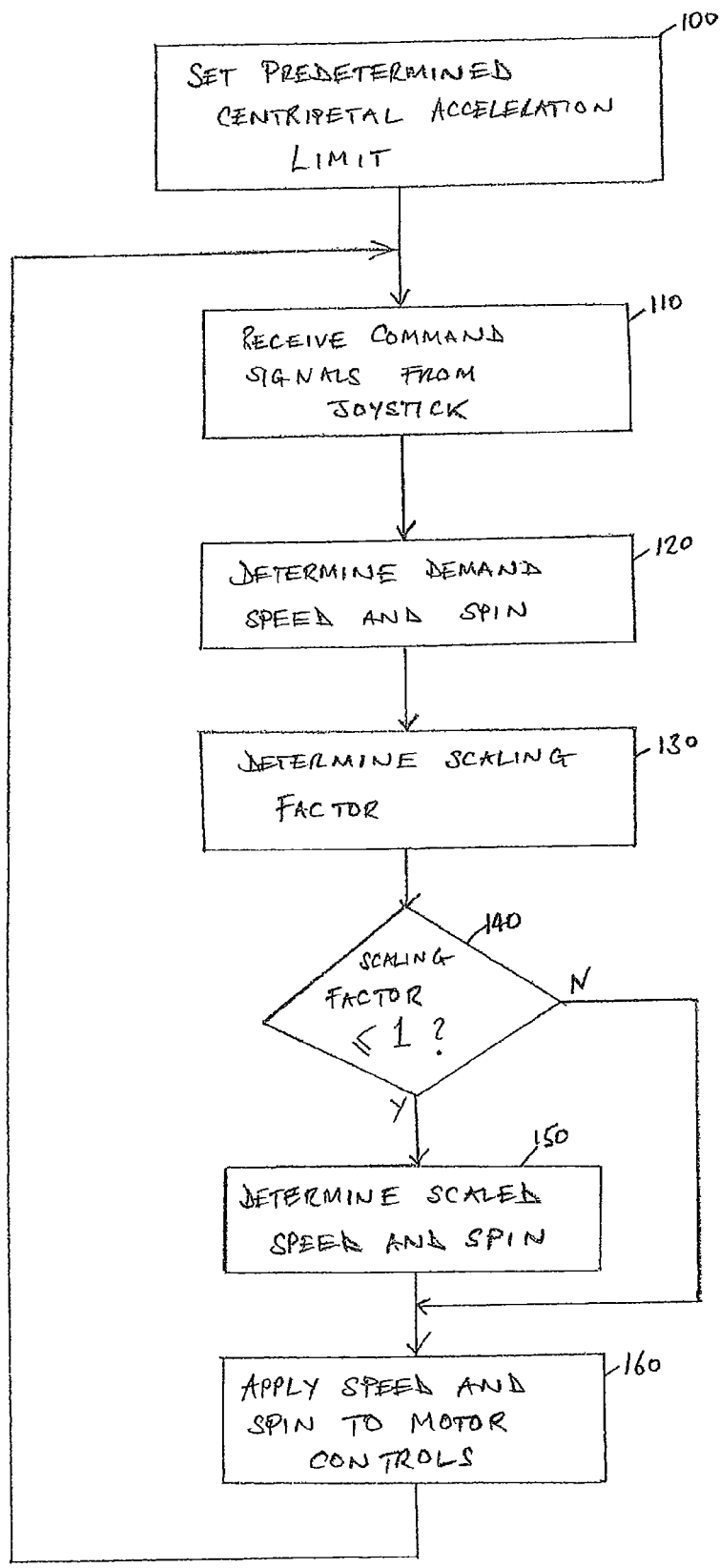
FIG. 2 is a flow diagram illustrating the steps performed by the control unit of FIG. 1A in accordance with one embodiment of the technology disclosed.

FIG. 2 is a flow diagram illustrating the operation of the control unit 30 illustrated in FIG. 1A and in particular the operation of the scaling unit 44.

At step 100 a predetermined centripetal acceleration limit is set and is stored in centripetal acceleration limit storage unit 42. The flow proceeds to step 110 where the control unit 30 receives command signals from joystick 32 and at step 120 the corresponding demand scaled speed and spin from these command signals is determined (in demand scaling unit 40). The scaling unit 44 then, at step 130, determines the scaling factor $K_{scalar}$ as defined in equation 5 above. At step 140 it is determined whether that scaling factor less than or equal to 1. If it is, then the scaling factor is applied to both the demand scaled speed and the spin at step 150. If the scaling factor is greater than 1, then step 150 is omitted. At step 160 the control unit 30 applies the speed and spin to motor controls 50 and 60 which control motors 20 and 22 respectively. The flow then returns to step 110 and continues.

Figure 3:
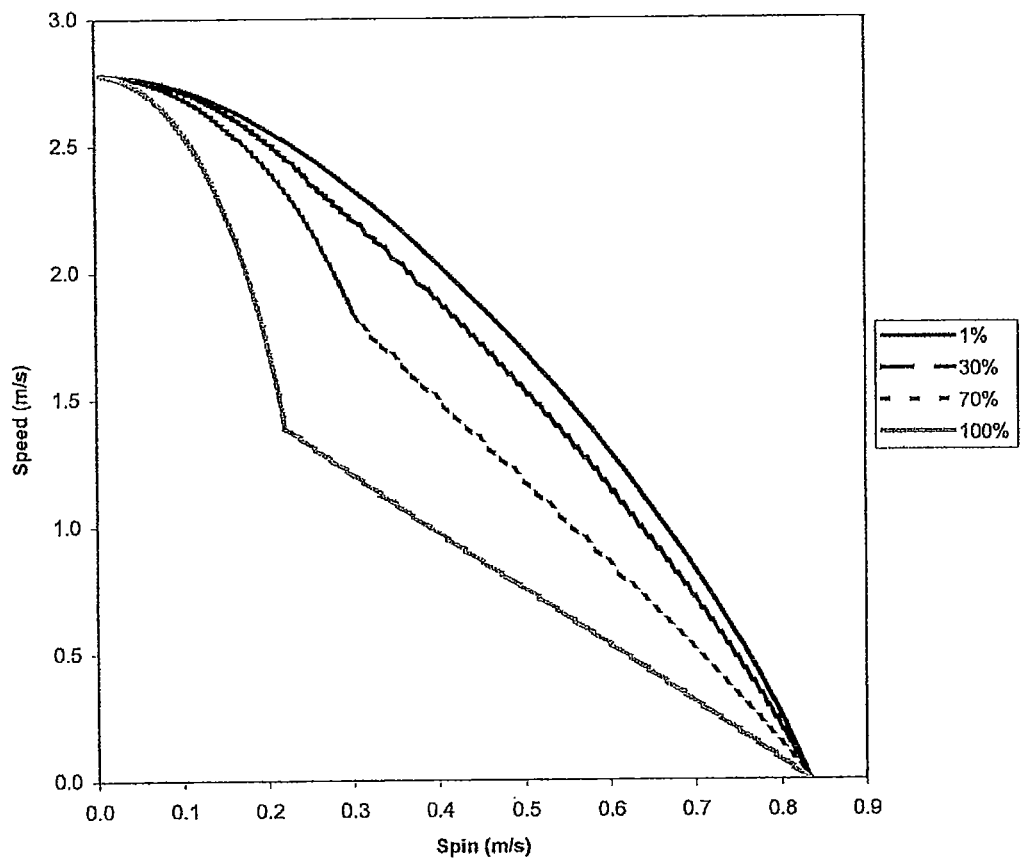
FIG. 3 is a graph illustrating the relationship between speed and spin in accordance with a known prior art technique.

FIG. 3 illustrates a simulation of the relationship between speed and spin for an existing control algorithm for a front wheel drive wheelchair. Here it is assumed that the maximum chair speed is 10 km/h at full motor voltage (24V) and the distance between the wheel centres is 0.58 m. The four different curves (labelled 1%, 30%, 70% and 100%) show how the relationship between speed and spin changes depending on the degree to which the standard front wheel drive gate shaping algorithm is applied (known as the FWD rate).

According to this standard FWD algorithm, with the FWD rate at 0%, a scalar of 1.0 is applied to the spin speed when the forward speed is 0% (3 o'clock position of the joystick), a scalar of 0.6 is applied at full forward speed (12 o'clock position of the joystick) and there is a linear interpolation between the two extremes.

With the FWD rate at 100%, a scalar of 1.0 is applied to the spin speed when the forward speed is 0% (3 o'clock position of the joystick), a scalar of 0.3 is applied at 50% forward speed and there is a linear interpolation between these two (such that, at 25% forward speed, a scalar of 0.65 is used). Anything above a forward speed of 50%, and the scalar remains at 0.3, never going any lower. Whilst this algorithm has been found to provide a generally useful response of the wheelchair, in particular avoiding dangerous combinations of speed and spin, some odd behaviours can arise as seen in the figure.

It can clearly be seen that whilst the gate shape is relatively smooth when the gate shaping algorithm is only moderately applied (30% or below) when the gate shaping algorithm is applied to a more significant degree (70% and above) a noticeable kink appears relationship between speed and spin. It has been found by users of such wheelchairs that such a discontinuous transitions in the gate shape can result in undesirable handling characteristics of the wheelchair.

Figure 4:
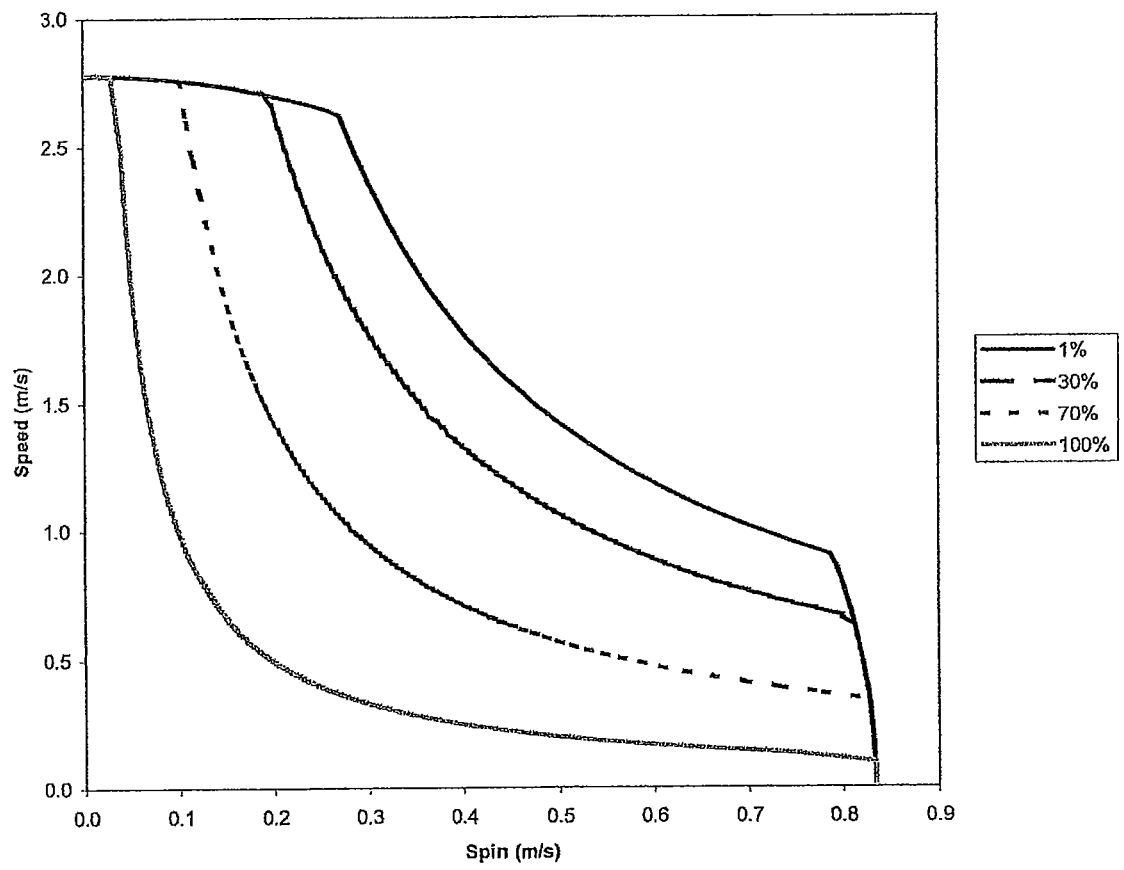
FIG. 4 is a graph illustrating the relationship between speed and spin in accordance with an embodiment to the technology disclosed.

FIG. 3 may be compared to FIG. 4 which shows the gate shape when the techniques of the technology disclosed are introduced. Accordingly it can be seen that when the gate shaping algorithm is applied that the kink identified in FIG. 3 is avoided. Furthermore there is a smooth transition between speed and spin across almost the entire range of accessible speeds and spins.

Figure 5:
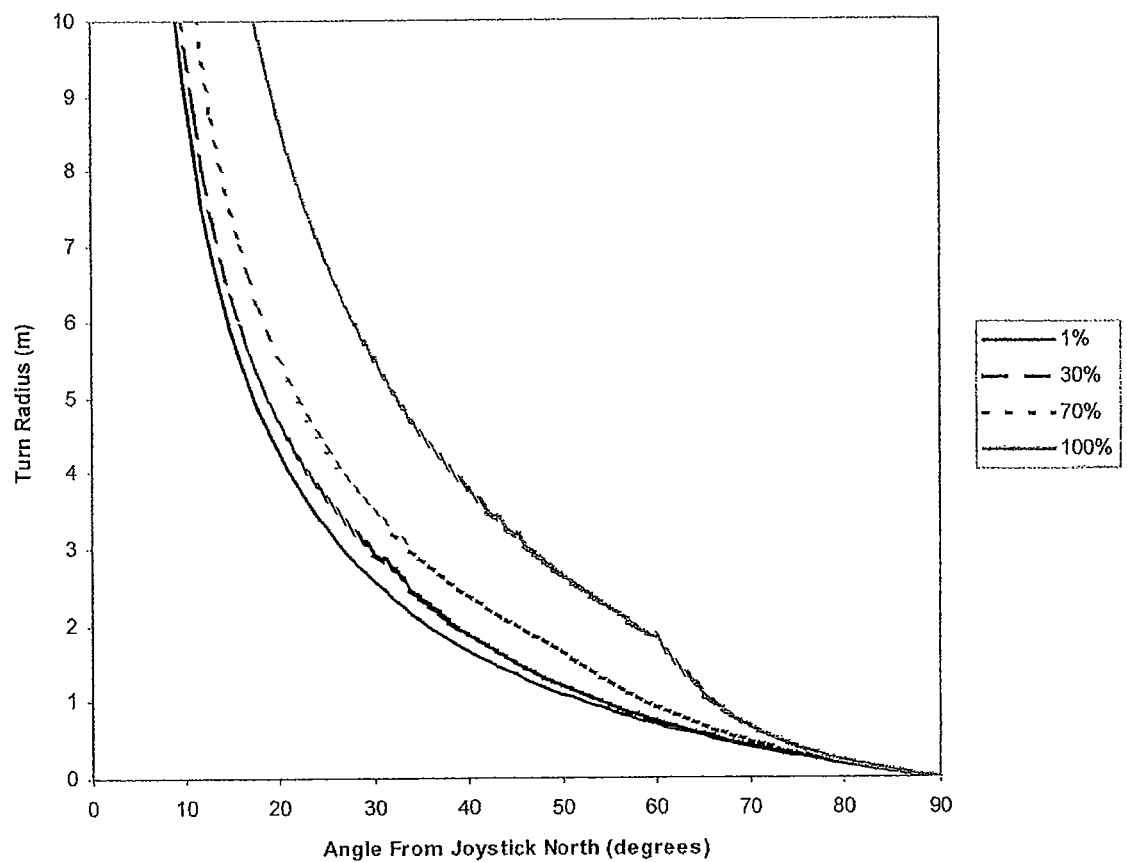
FIG. 5 is a graph illustrating the relationship between turn radius and joystick angle in accordance with a known prior art technique.
Figure 6:
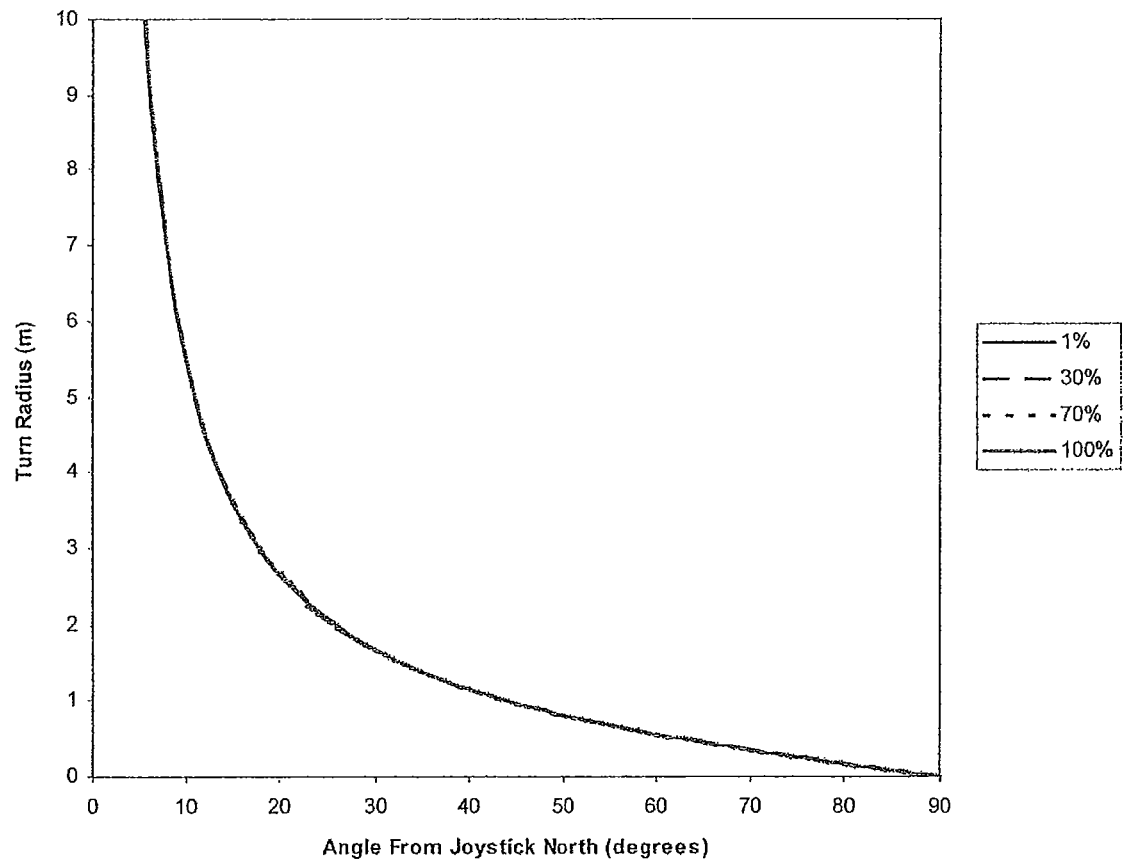
FIG. 6 is a graph illustrating the relationship between turn radius and joystick angle in accordance an embodiment of the technology disclosed.

A particular advantage of the technology disclosed can be seen from a comparison of FIGS. 5 and 6 which illustrate the relationship between turn radius of the wheelchair and the angle of the joystick. FIG. 5 illustrates the performance for a wheelchair controlled in accordance with a known algorithm, whilst FIG. 6 illustrates the performance when the techniques of the technology disclosed are introduced. In FIG. 5 it can be seen that there is a moderate dependency of the shape of the curve depending on the degree to which the standard gate shaping algorithm is applied and in particular that when the standard algorithm is applied at a high level noticeable kink appears corresponding to a turn radius of approximately 2 meters. It will be appreciated that a turn radius of approximately 2 meters is relatively common for a wheelchair and hence this represents an undesirable handling characteristic for the users of such wheelchairs. By comparison, notice that FIG. 6 shows that the variation of turn radius with joystick angle is independent of the level at which the gate shaping algorithm is applied. This advantageous because it means that the turning response of wheelchair will be experienced as the same for the user whatever the level of gate shaping that is applied. Furthermore notice that the turn radius varies smoothly with joystick angle and hence the user is provided with a more consistent interaction with the controls of the wheelchair.

Figure 7:
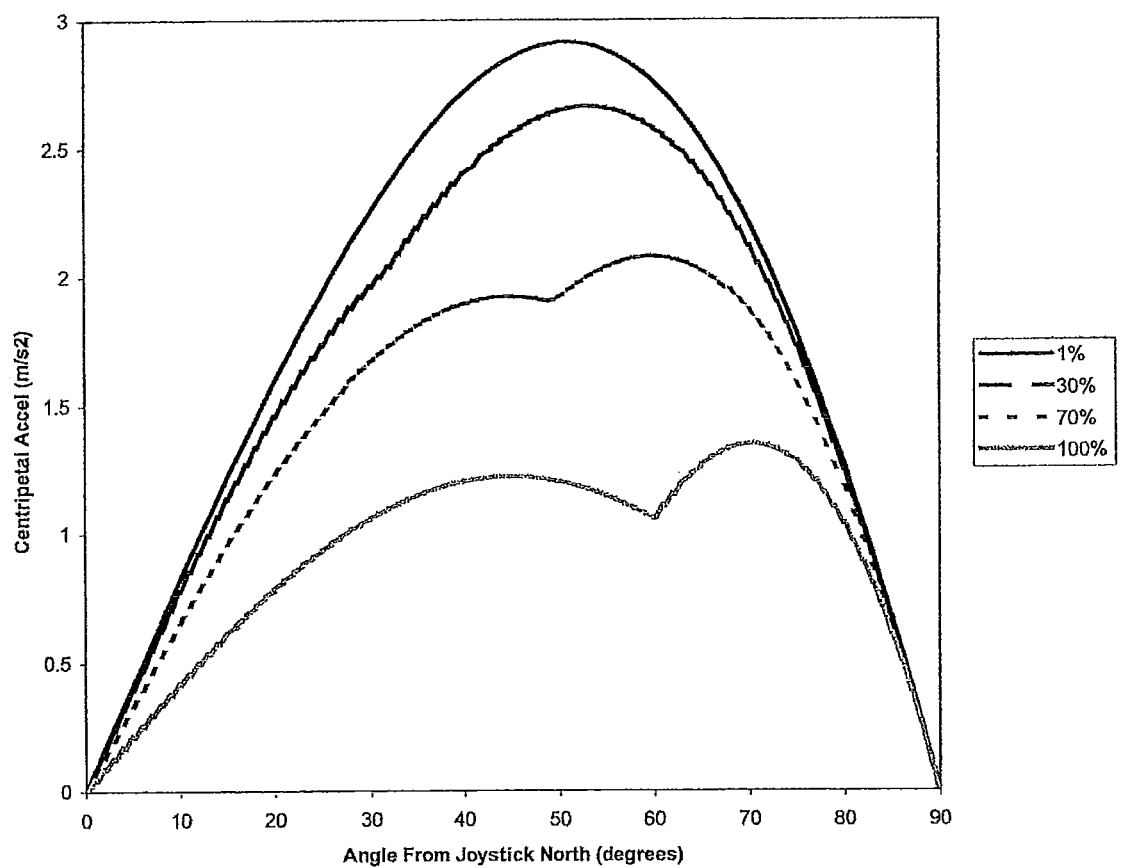
FIG. 7 is a graph illustrating the relationship between centripetal acceleration and joystick angle in accordance with a known prior art technique.
Figure 8:
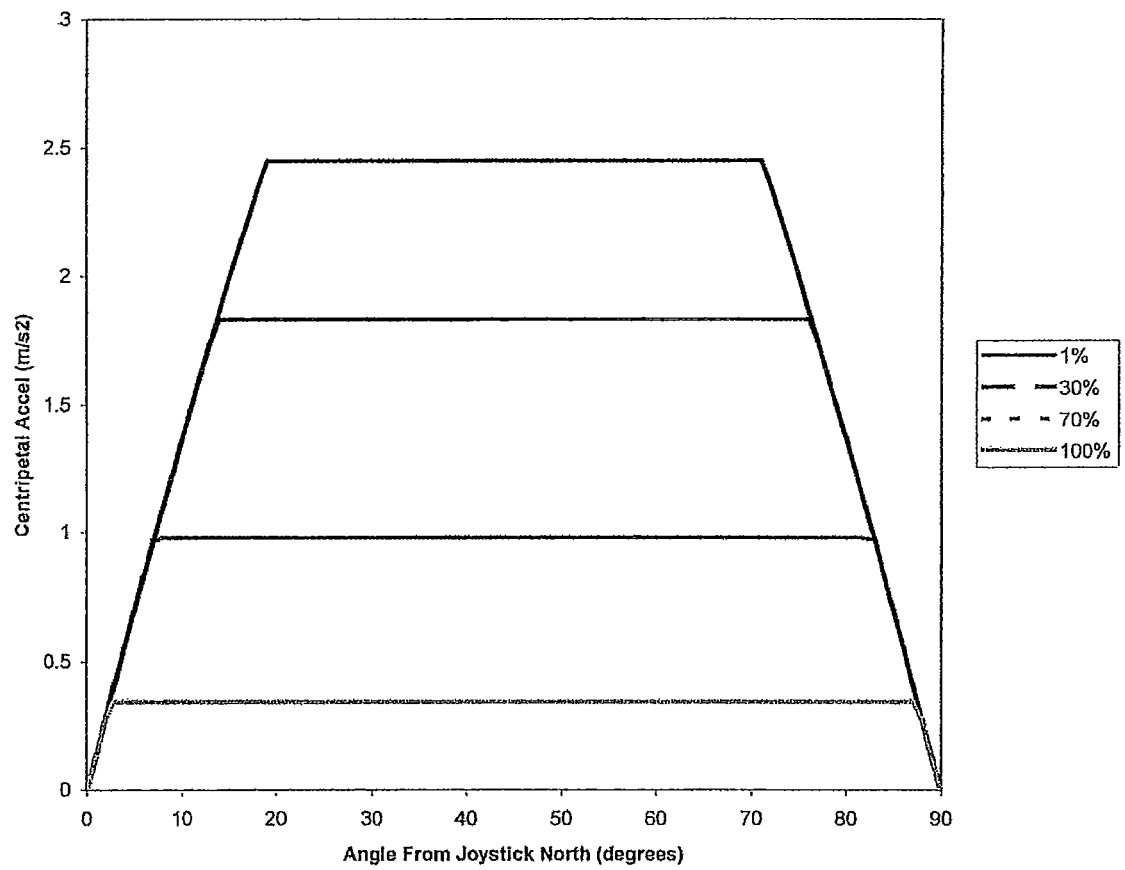
FIG. 8 is a graph illustrating the relationship between centripetal acceleration and joystick angle in accordance with an embodiment of the technology disclosed.

The advantage of the techniques of the technology disclosed can also be clearly seen from a comparison of FIGS. 7 and 8 which show the relationship between centripetal acceleration and joystick angle. In FIG. 7 it can be seen that the known gate shaping algorithm also results in discontinuities in the centripetal acceleration when the gate shaping algorithm is applied to a higher degree. It should be appreciated that since the user of the wheelchair will be particularly aware of centripetal acceleration (the degree to which they are thrown to one side when cornering) that the discontinuities that occur between 50 and 60 degrees of joystick angle could result in an unpleasant user experience. By contrast it can be seen that there is no variation in centripetal acceleration across a wide range of joystick angles when the techniques of the technology disclosed are applied. Hence, as the user varies the joystick angle, their experience of the centripetal acceleration does not vary, resulting in a smoother and hence more pleasant user experience.

In general it has been found that the following improvements were made by introducing the techniques of the technology disclosed. Firstly with the known gate shaping algorithm there is a joystick angle where the wheelchair noticeably slows down leading to a tighter turn radius. With the technology disclosed, there were no perceived discontinuities in speed or in turn radius. Secondly with the techniques of the technology disclosed implemented, the wheelchair drives more slowly around a tight turn radius, effectively counteracting the problematic spin-in effect. Thirdly with the prior art algorithm it was relatively easy to lose traction on the inside wheel when moving from full spin around the gate to fall forward. The algorithm of the technology disclosed reduces this effect.

Figure 9:
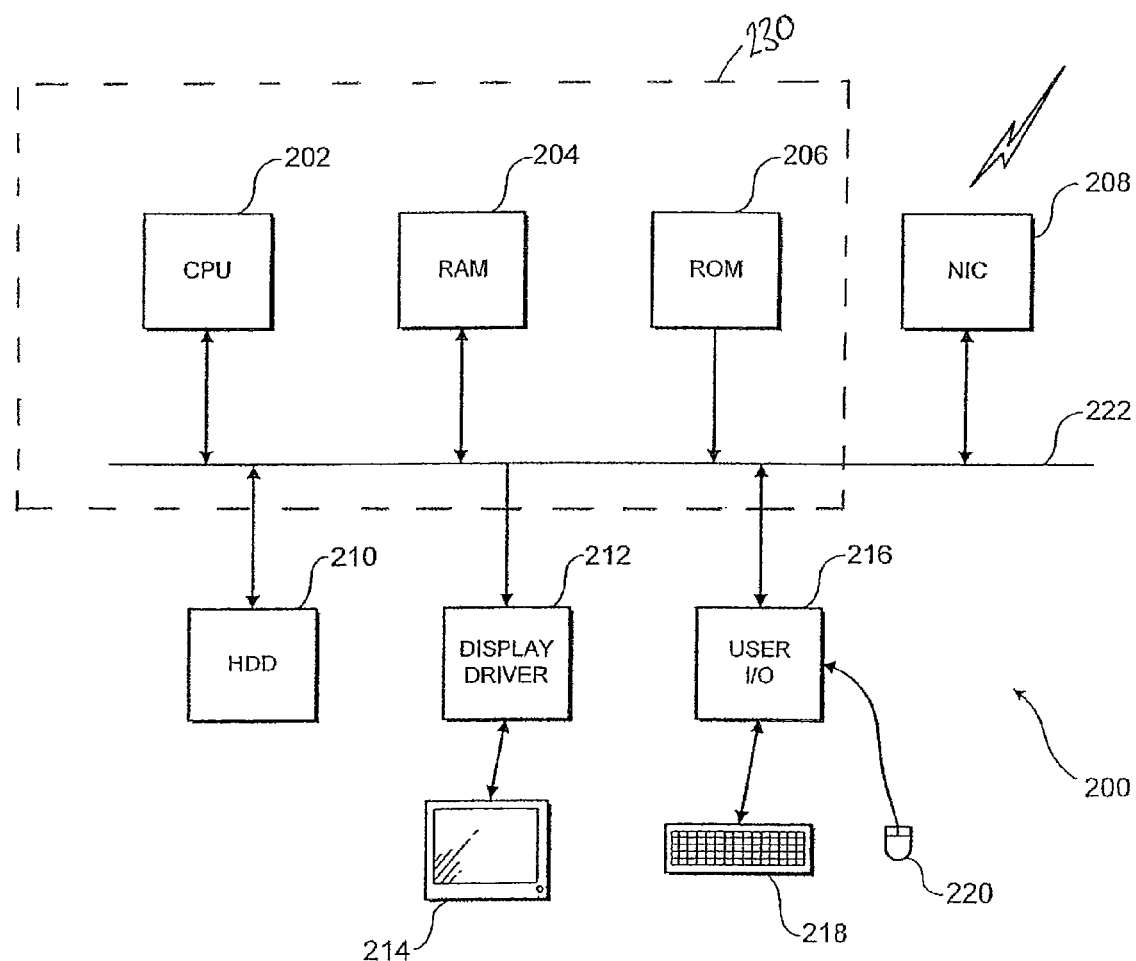
FIG. 9 is a schematic representation of a general purpose computing device which may be used in embodiments of the technology disclosed.

FIG. 9 schematically illustrates a general purpose computing device 200 of the type that may be used to implement the above described techniques. As mentioned above, in the context of the technology disclosed this could for example be an embedded processor forming part of the control unit of the wheelchair. The general purpose computing device 200 includes a central processing unit 202, a random access memory 204 and a read only memory 206, connected together via bus 222. More fully, the general purpose computing device may be extended to further comprise a network interface card 208, a hard disk drive 210, a display driver 212 and monitor 214 and a user input/output circuit 216 with a keyboard 218 and mouse 220 all connected via the common bus 222. In operation, such as when forming part of the control system of an active wheelchair, the central processing unit 202 will execute computer program instructions that may for example be stored in the random access memory 204 and/or the read only memory 206. These core components of the general purpose computing device are labelled 230 in FIG. 9. The additional components outside the dashed box 230 may additionally be connected, for example when the control system is connected to a diagnostic set-up for pre-programming or for troubleshooting. In such a situation program instructions could be additionally retrieved from the hard disk drive 210 or dynamically downloaded via the network interface card 208. The results of the processing performed may be displayed to a user or an engineer via a connected display driver 212 and monitor 214. User inputs for controlling the operation of the general purpose computing device 200 may be received via a connected user input output circuit 216 from the keyboard 218 or the mouse 220. It will be appreciated that the computer program could be written in a variety of different computer languages. The computer program may be stored locally on a recording medium or dynamically downloaded to the general purpose computing device 200. When operating under control of an appropriate computer program, the general purpose computing device 200 can perform the above described techniques and can be considered to form an apparatus for performing the above described technique. The architecture of the general purpose computing device 200 could vary considerably and FIG. 9 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim as follows:

1. A controller for a motorized vehicle having at least a left wheel and a right wheel, said left wheel and said right wheel being driven independently by a motor arrangement, the controller being arranged to receive control signals from a user input device of the motorized vehicle, the control signals determining a requested left wheel velocity and a requested right wheel velocity,
   wherein a requested speed of said motorized vehicle is given by a mean of said requested left wheel velocity and said requested right wheel velocity, and
   wherein a requested spin of said motorized vehicle is given by a mean difference of said requested left wheel velocity and said requested right wheel velocity, the controller comprising:
   a scaling unit configured to determine a scaling factor in dependence on said requested speed and said requested spin, and to scale both said requested speed and said requested spin by said scaling factor to generate a target speed and a target spin,
   wherein said controller is configured to convert said target speed and said target spin into a target left wheel velocity and a target right wheel velocity, the motor arrangement being responsive to said controller to drive said left wheel at said target left wheel velocity and to drive said right wheel at said target right wheel velocity.

2. A controller as claimed in claim 1, wherein said scaling unit is configured to determine said scaling factor in dependence on a centripetal acceleration limit for said motorized vehicle.

3. A controller as claimed in claim 2, wherein said scaling unit is configured to implement said centripetal acceleration limit as a centripetal force limit.

4. A controller as claimed in claim 2, wherein said scaling factor is proportional to a square root of said centripetal acceleration limit.

5. A controller as claimed in claim 2, wherein said centripetal acceleration limit corresponds to an upper limit of centripetal acceleration of said motorized vehicle on a turn, wherein the one of said left wheel and said right wheel which is inside the turn loses traction when said motorized vehicle has a centripetal acceleration above said centripetal acceleration limit.

6. A controller as claimed in claim 2, comprising a storage unit for storing a predetermined value of said centripetal acceleration limit.

7. A controller as claimed in claim 1, wherein said scaling factor is inversely proportional to a square root of a product of said requested speed and said requested spin.

8. A controller as claimed in claim 1, wherein said scaling factor ($K_{scalar}$) is defined as $$K_{Scalar} = \sqrt{\frac{CentripetalAccelerationLimit}{RequestedSpeed \cdot RequestedSpin}}.$$

9. A controller as claimed in claim 1, wherein said scaling factor has an upper limit of one.

10. A controller as claimed in claim 1, wherein said control signals comprise a forward signal and a spin signal.

11. A controller as claimed in claim 1, wherein said motorized vehicle is a front wheel drive vehicle.

12. A controller as claimed in claim 1, for use in a motorized vehicle taking the form of a wheelchair.

13. A motorized vehicle comprising:
   a motor arrangement;
   at least a left wheel and a right wheel, said left wheel and said right wheel being driven independently by said motor arrangement;
   a user input device configured to issue control signals for the motorized vehicle, the control signals corresponding to a requested left wheel velocity and a requested right wheel velocity; and
   a controller as claimed in any preceding claim for controlling the driving of said left wheel and said right wheel in dependence on said control signals.

14. A motorized vehicle as claimed in claim 13, wherein said motorized vehicle is a wheelchair.

15. A method of controlling a motorized vehicle having at least a left wheel and a right wheel, said left wheel and said right wheel being driven independently by a motor arrangement through a controller, comprising the steps of:
   receiving control signals from a user input device of the motorized vehicle, the control signals determining a requested left wheel velocity and a requested right wheel velocity,
   wherein a requested speed of said motorized vehicle is given by a mean of said requested left wheel velocity and said requested right wheel velocity, and
   wherein a requested spin of said motorized vehicle is given by a mean difference of said requested left wheel velocity and said requested right wheel velocity;
   determining a scaling factor in dependence on said requested speed and said requested spin;
   scaling both said requested speed and said requested spin by said scaling factor to generate a target speed and a target spin; and
   converting said target speed and said target spin into a target left wheel velocity and a target right wheel velocity, the motor arrangement being responsive to said controller to drive said left wheel at said target left wheel velocity and to drive said right wheel at said target right wheel velocity.

16. A non-transitory computer readable storage medium comprising a computer program which when executed on a computing device causes a motorized vehicle having at least a left wheel and a right wheel, said left wheel and said right wheel being driven independently by a motor arrangement through the computing device, to be controlled in accordance with a procedure for which the computer program is configured:
- to receive control signals from a user input device of the motorized vehicle, the control signals determining a requested left wheel velocity and a requested right wheel velocity,
  - wherein a requested speed of said motorized vehicle is given by a mean of said requested left wheel velocity and said requested right wheel velocity, and
  - wherein a requested spin of said motorized vehicle is given by a mean difference of said requested left wheel velocity and said requested right wheel velocity;
- to determine a scaling factor in dependence on said requested speed and said requested spin;
- to scale both said requested speed and said requested spin by said scaling factor to generate a target speed and a target spin; and
- to convert said target speed and said target spin into a target left wheel velocity and a target right wheel velocity, the motor arrangement being responsive to said computing device to drive said left wheel at said target left wheel velocity and to drive said right wheel at said target right wheel velocity.

17. A controller for a motorized vehicle having at least a left wheel and a right wheel, said left wheel and said right wheel being driven independently by a motor arrangement, the controller being arranged to receive control signals from a user input device of the motorized vehicle, the control signals determining a requested left wheel velocity and a requested right wheel velocity,
- wherein a requested speed of said motorized vehicle is given by a mean of said requested left wheel velocity and said requested right wheel velocity, and
- wherein a requested spin of said motorized vehicle is given by a mean difference of said requested left wheel velocity and said requested right wheel velocity, the controller comprising:
- a scaling means for determining a scaling factor in dependence on said requested speed and said requested spin, and for scaling both said requested speed and said requested spin by said scaling factor to generate a target speed and a target spin,
- wherein said controller is configured to convert said target speed and said target spin into a target left wheel velocity and a target right wheel velocity, the motor arrangement being responsive to said controller to drive said left wheel at said target left wheel velocity and to drive said right wheel at said target right wheel velocity.

\* \* \* \* \*